(12) United States Patent
Keith

(10) Patent No.: US 8,919,215 B2
(45) Date of Patent: Dec. 30, 2014

(54) ORBITAL MOTION ATTACHMENT WITH COUNTERWEIGHT FOR ANGLE DIE GRINDER

(76) Inventor: Roger C. Keith, Euclid, OH (US)

( * ) Notice: Subject to any disclaimer, the term of this patent is extended or adjusted under 35 U.S.C. 154(b) by 249 days.

(21) Appl. No.: 13/414,533

(22) Filed: Mar. 7, 2012

(65) Prior Publication Data

US 2012/0227520 A1 Sep. 13, 2012

Related U.S. Application Data

(60) Provisional application No. 61/450,082, filed on Mar. 7, 2011.

(51) Int. Cl.
*B23P 11/00* (2006.01)
*B23Q 11/00* (2006.01)
*B24B 23/04* (2006.01)

(52) U.S. Cl.
CPC ............ *B24B 23/04* (2013.01); *B23Q 11/0035* (2013.01)
USPC .................................. 74/87; 29/428; 451/28

(58) Field of Classification Search
CPC ............................ B23Q 11/0035; B24B 23/04
USPC .................... 74/86, 87; 29/428; 451/28, 359
See application file for complete search history.

(56) References Cited

U.S. PATENT DOCUMENTS

| | | | | |
|---|---|---|---|---|
| 3,568,307 A * | 3/1971 | Harrison | ..................... | 228/110.1 |
| 3,721,971 A * | 3/1973 | Gruber | ......................... | 307/116 |
| 3,765,687 A * | 10/1973 | Weiss | ............................ | 277/503 |
| 3,783,225 A * | 1/1974 | Filsinger | ..................... | 219/69.2 |
| 3,928,947 A * | 12/1975 | Millett | .......................... | 451/359 |
| 3,940,818 A * | 3/1976 | Anderson | ...................... | 15/3.53 |
| 4,286,761 A * | 9/1981 | Musgrove | ................... | 244/99.2 |
| 4,480,506 A * | 11/1984 | Chapman | ........................... | 76/4 |
| 4,534,093 A * | 8/1985 | Jahnke et al. | ................. | 29/26 A |
| 4,729,194 A * | 3/1988 | Maier et al. | ..................... | 451/357 |
| 5,024,114 A * | 6/1991 | Guttinger | .......................... | 74/86 |
| 5,069,094 A * | 12/1991 | Birkestrand | .................... | 82/121 |
| 6,807,878 B2 * | 10/2004 | Wren | ........................... | 74/125.5 |
| 7,270,025 B2 * | 9/2007 | Niglov | ............................. | 74/86 |
| 7,520,800 B2 * | 4/2009 | Duescher | ..................... | 451/527 |
| 8,590,408 B2 * | 11/2013 | Stein et al. | ....................... | 74/87 |
| 2002/0122730 A1 * | 9/2002 | Dexter et al. | ................ | 417/299 |
| 2008/0032601 A1 * | 2/2008 | Arcona et al. | ..................... | 451/1 |
| 2011/0116880 A1 * | 5/2011 | Nakamura et al. | ............ | 408/1 R |
| 2011/0223836 A1 * | 9/2011 | Duescher | ......................... | 451/28 |
| 2012/0227520 A1 * | 9/2012 | Keith | ................................ | 74/86 |

* cited by examiner

*Primary Examiner* — David M Fenstermacher
(74) *Attorney, Agent, or Firm* — Howard M. Cohn; Daniel Cohn

(57) ABSTRACT

An orbital motion attachment for a die grinder includes a flexible collar mounted at a first end to a locating support ring and the locating support ring being removably secured to the die grinder. A collet has an offset bearing shaft extending from a first end. The collet is connected at a second end to an output shaft of the die grinder and the offset bearing shaft is connected at a second end to an applicator tip. An indexing ring is affixed to a second end of the flexible collar to secure the applicator tip to the offset bearing shaft.

7 Claims, 9 Drawing Sheets

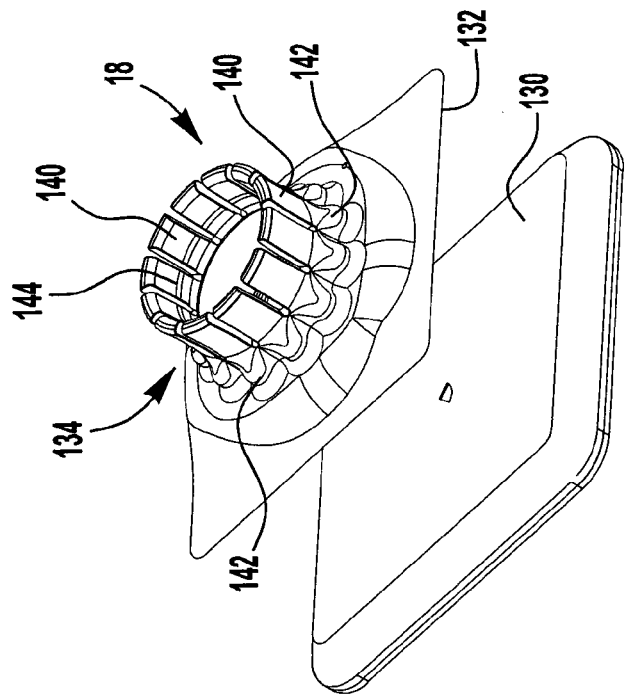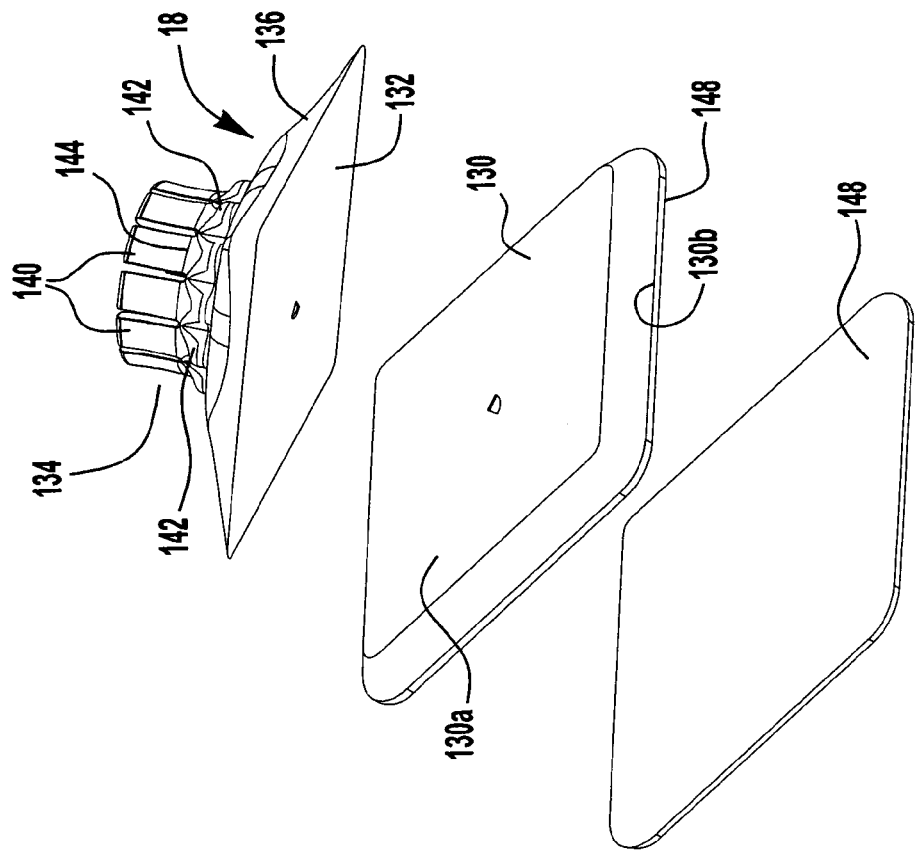

ORBITAL MOTION ATTACHMENT WITH COUNTERWEIGHT FOR ANGLE DIE GRINDER

CROSS-REFERENCE TO RELATED APPLICATIONS

This application claims the benefit of U.S. Provisional Patent Application No. 61/450,082 filed on Mar. 7, 2011, which is incorporated herein by reference.

TECHNICAL FIELD OF THE INVENTION

The present invention is directed to an orbital motion attachment for an angle die grinder and more particularly to an orbital motion attachment with a counterweight for an angle die grinder.

BACKGROUND OF THE INVENTION

Currently, pneumatically operated, angle die grinders support a very large variety of tools that include disc sanders, drum sanders, cutoff wheels, bun tools of all kinds, buffers, wire wheels and stirrers. Each of these tools comes in a large number of sizes and shapes, each specific to their applications. Typically, pneumatically operated, angle die grinders are used in automotive body shops as well as any type of work shop where surface finishing is done.

Generally speaking, these angle die grinders provide rotary motion of abrasive surface materials such as sandpaper discs, belts, and drums. Commonly, angle grinders consist of a hand-held motor portion, driven electrically or pneumatically, and a rotating output shaft portion that holds a wheel upon which is disposed a disc of surface treatment material such as sand paper. The axis of rotation of the rotating output shaft with the wheel secured to one end is disposed at an angle, commonly about 90 degrees, to the axis of rotation of the motor. In some angle grinders, the angle is adjustable over a range, so as to provide ease of access to surfaces being ground, sanded or otherwise treated, as in polishing, buffing and like surface treatments.

In the case of grinding where the abrasive material is commonly a rotating disc of sandpaper or equivalent abrasive material, the rotary motion that is delivered to the disc by means of a wheel to which the disc is attached by various means such as, commonly, a central screw or adhesive.

SUMMARY OF THE INVENTION

An embodiment of the present invention is an orbital motion attachment for a die grinder. The orbital motion attachment includes a flexible collar mounted at a first end to a locating support ring and the locating support ring being removably secured to the die grinder. A collet has an offset bearing shaft extending from a first end. The collet is connected at a second end to an output shaft of the die grinder and the offset bearing shaft is connected at a second end to an applicator tip. An indexing ring is affixed to a second end of the flexible collar to secure the applicator tip to the offset bearing shaft.

Another embodiment of the present invention is directed to a method of mounting an orbital motion attachment to a die grinder. The method includes mounting a flexible collar at a first end to a locating support ring, and removably securing the locating support ring being to the die grinder. A collet is provided having an offset bearing shaft extending from a first end thereof. A second end of the collet is connected to an output shaft of the die grinder and a second end of the offset bearing shaft is connected to an applicator tip. An indexing ring is affixed to a second end of the flexible collar to secure the applicator tip to the offset bearing shaft.

BRIEF DESCRIPTION OF THE DRAWINGS

FIG. 7 is a cross sectional view of the angle die grinder, the flexible collar, the indexing ring and the applicator tip in a loaded condition, in accordance with the present invention.

FIG. 8 is an exploded, three dimensional view of the applicator tip, the applicator pad and the sandpaper face, in accordance with the present invention.

DETAILED DESCRIPTION OF THE PREFERRED EMBODIMENTS

Figure 1:
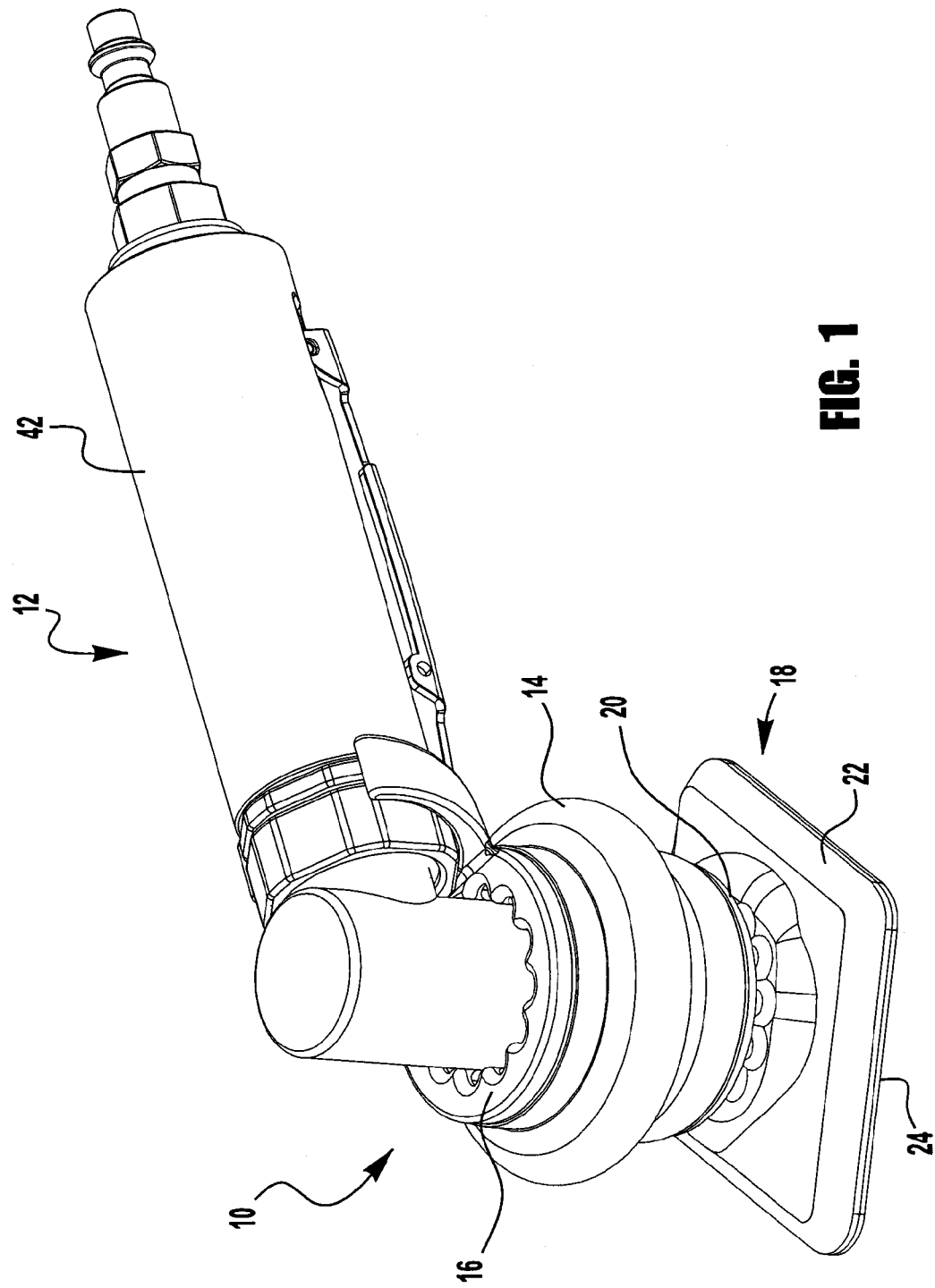
FIG. 1 is a three dimensional view of an angle die grinder, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The present invention is directed to an assembled orbital motion attachment 10 for an angle die grinder 12. Referring now to the drawings, FIG. 1 is a three dimensional side view of angle die grinder 12 with a flexible collar 14 mounted with a locating support ring 16 to the angle grinder. An applicator tip 18 which connects with and locks into an indexing ring 20 that is affixed to the flexible collar 14, holds an applicator pad 22 to which attaches a sheet 24 of surface finishing material. The applicator tip 18, which itself can have a multiplicity of shapes, transfers orbital motion from a rotary offset bearing shaft 26 and bearings 28, 30 disposed within the flexible collar 14, as shown in FIGS. 3 and 4, to the applicator tip 18 and ultimately sheet 24 of surface finishing material.

Figure 2:
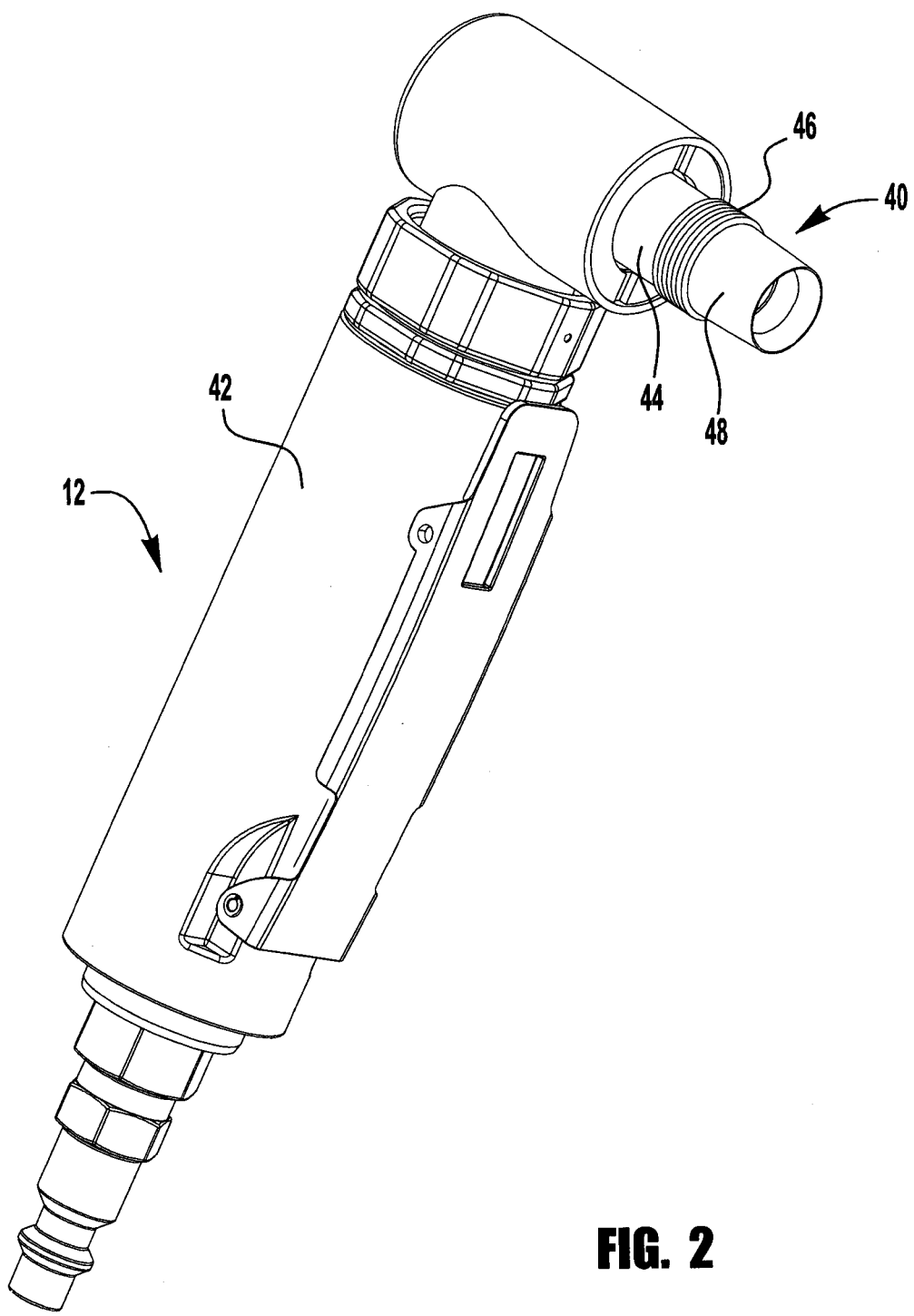
FIG. 2 is a three dimensional side view of an angle die grinder with a flexible collar mounted with a locating support ring to the angle grinder, in accordance with the present invention.

As shown in FIG. 2, die grinder 12 has a 90 degree angle head with an output shaft 40 that typically has a rotational speed of about 20,000 RPM. A 90° beveled gear (not shown) within the handle 42 of the die grinder 12 transfers the rotation of an air driven motor (not shown) to an output shaft 40. The output shaft 40 has an inner section 44 of a first diameter, a threaded intermediate section 46 having with a second diameter larger than the first diameter and an outer section 48 that has approximately the same diameter as inner section 44.

Figure 3:
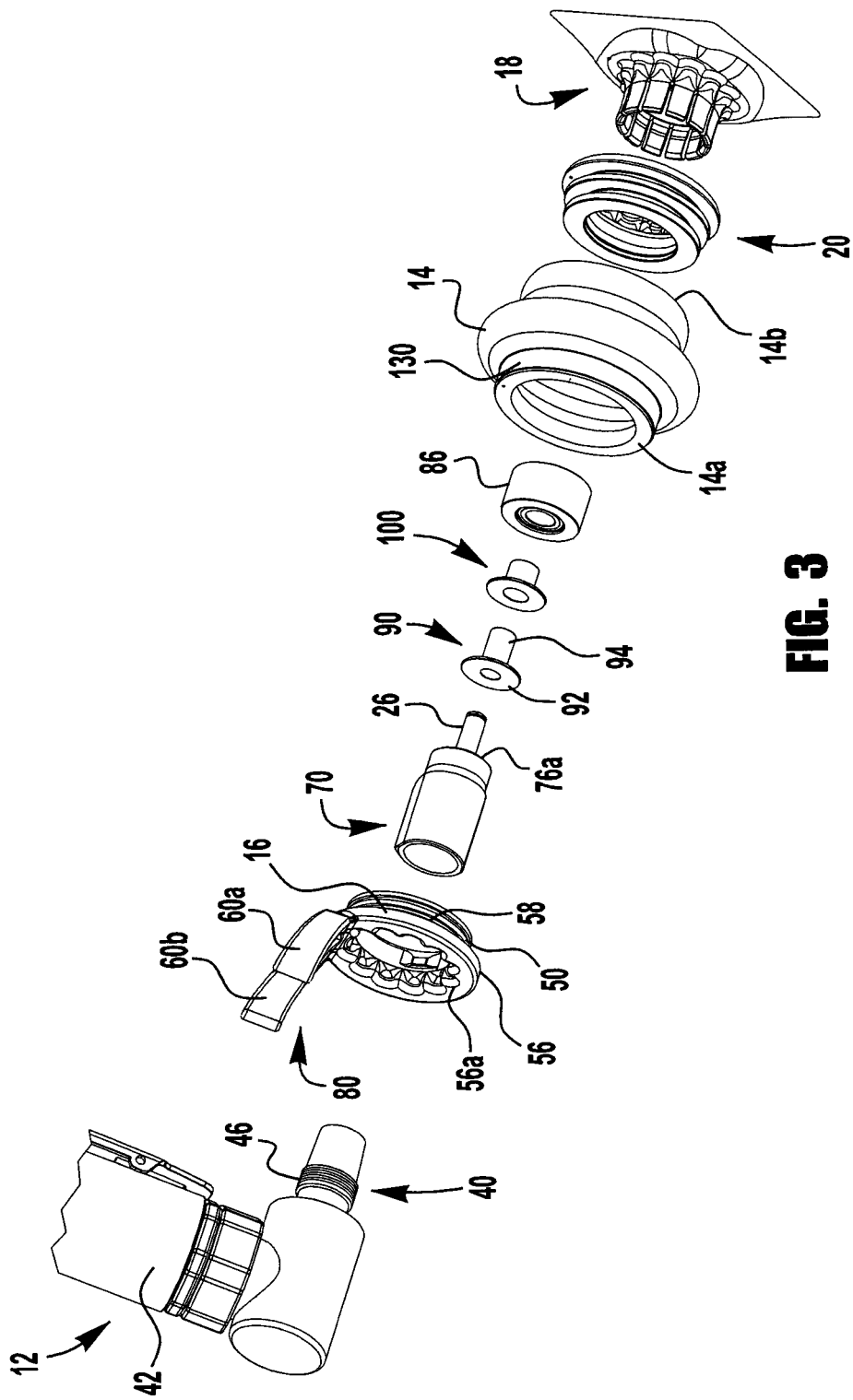
FIG. 3 is an exploded, three dimensional view of the angle die grinder, the flexible collar, the indexing ring and the applicator tip, in accordance with the present invention
Figure 4:
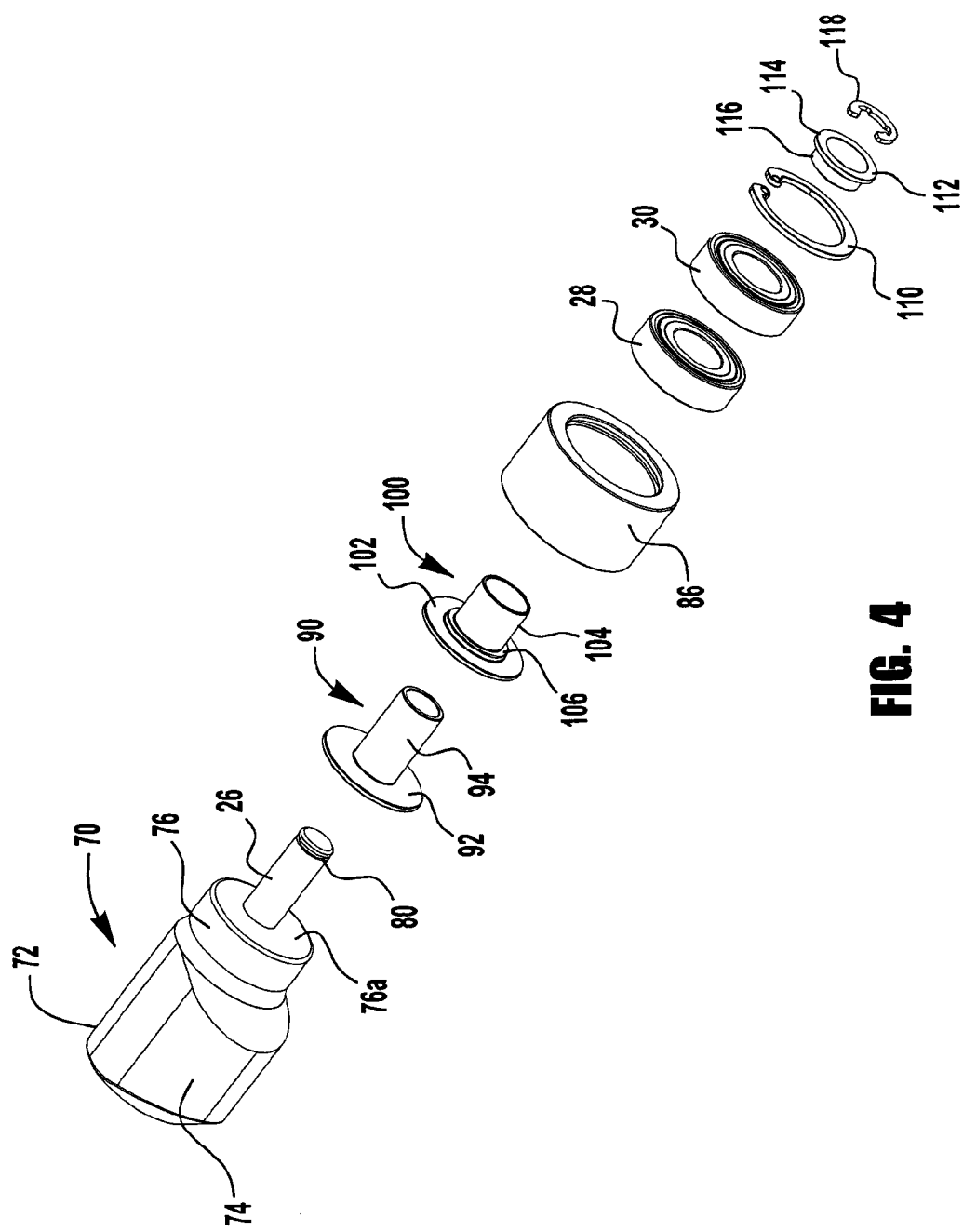
FIG. 4 is an exploded, three dimensional view of the bearing assembly, in accordance with the present invention.
Figure 5:
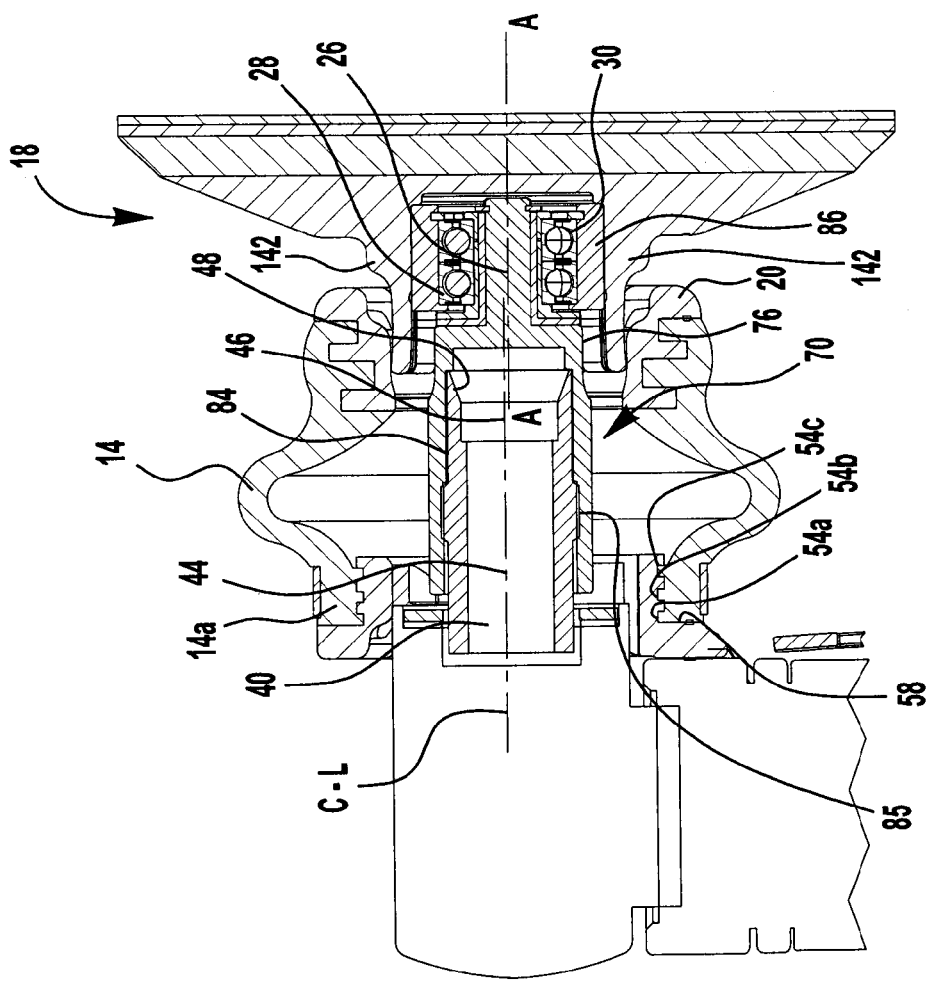
FIG. 5 is a cross sectional view of the angle die grinder, the flexible collar, the indexing ring and the applicator tip, in accordance with the present invention.

Referring to FIG. 3, there is illustrated an exploded, three dimensional view of the angle die grinder 12 with the shaft 40 extending there from. A locating support ring 16 has an outer cylindrical section 52 having an outer diameter with a plurality of grooves 54a, 54b, and 54c, as seen in FIG. 5, formed therein. Locating support ring 50 has an inner cylindrical section 56 that has a larger outer diameter than outer cylindrical section 52 to form a shoulder 58. Locating support ring 16 has a semi circular section 60 having pair of flexible ears 60a and 60b that project outward at a right angle to the outward facing rear surface 56a of the outer cylindrical section 56. The semicircular section 60 can receive the handle 42 of the grinder 12. To attach the support ring 16 to the handle 42, the flexible ears 60a and 60b are pressed against the handle 42 until the ears 60a and 60b flex outward to separate from each other and the handle 42 is disposed against the inner surface of section 60. Then, the ears 60a and 60b will be biased back towards so that the handle 42 is grasped by the supporting ring.

Referring to FIGS. 3, 4, 5 and 6, there is illustrated a collet 70 having a first section 72 with a counterweight 74 projecting there from, a second section 76 extending outward from the first section and a third section 78 forming the rotary offset bearing shaft 26 with a groove 80 at one end to receive a retainer ring as discussed herein after.

Figure 6:
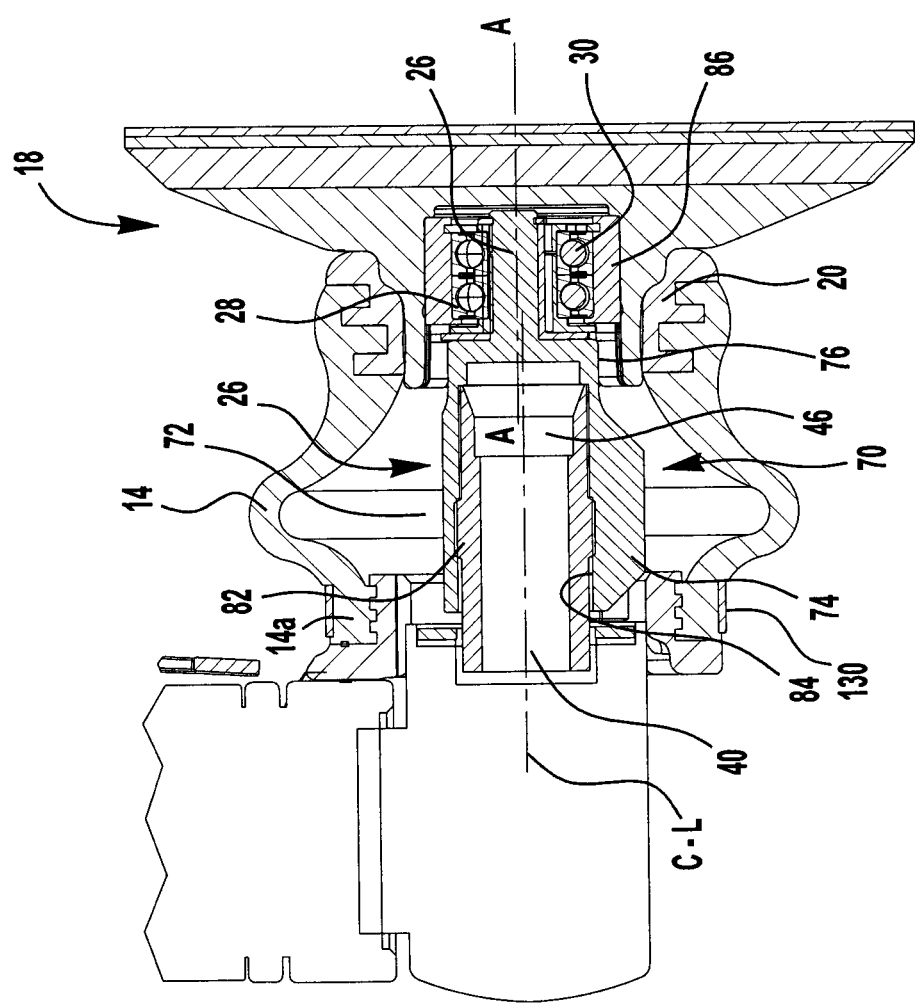
FIG. 6 is a cross sectional view of the angle die grinder, the flexible collar, the indexing ring and the applicator tip in an unloaded condition, in accordance with the present invention.

As seen in FIGS. 5 and 6, collet 70 can be constructed with a closed bore 84 having a threaded section 85 that can be threaded onto section 46 of shaft 40. The offset bearing shaft 26 is supported by bearings 28 and 30 disposed within a bearing cage 86.

The collet 70 has a center line extending therethrough which is aligned with the centerline C-L through the bore of the output shaft 40. The offset bearing shaft 26 has a center line A-A which is offset from the center line C-L through the bore of the output shaft 40 by about 0.020 inches to about 0.050 inches. The counterweight 74 is disposed on the opposite side of the centerline C-L from the centerline A-A to offset the forces caused by any offset portions such as the collet 70, the bearings 28 and 30, and the applicator tip 18. The added material of counterweight 74 extends about 180° from the centerline A-A of the offset shaft 26 as shown in FIGS. 4 and 6.

Referring again to FIGS. 3 and 4, an isolation and insulation bushing 90 having a flange section 92 located at one end of the cylindrical section 94 is disposed on the bearing shaft 26 so that the flange section 92 is abutted against the forward face 76a of second section 76 of the collet 70. The isolation and insulation bushing 90 can be constructed of a plastic material such as Rulon, to absorb high frequency vibrations that could migrate into the bearings 28 and 30 and then into the applicator tip 18. These high frequency vibrations originate from the bevel gear transfer through the gear teeth (not shown) that transfers the rotation from the air driven motor (not shown) to the output shaft 40 through a 90° beveled gear (not shown).

Figure 5A:
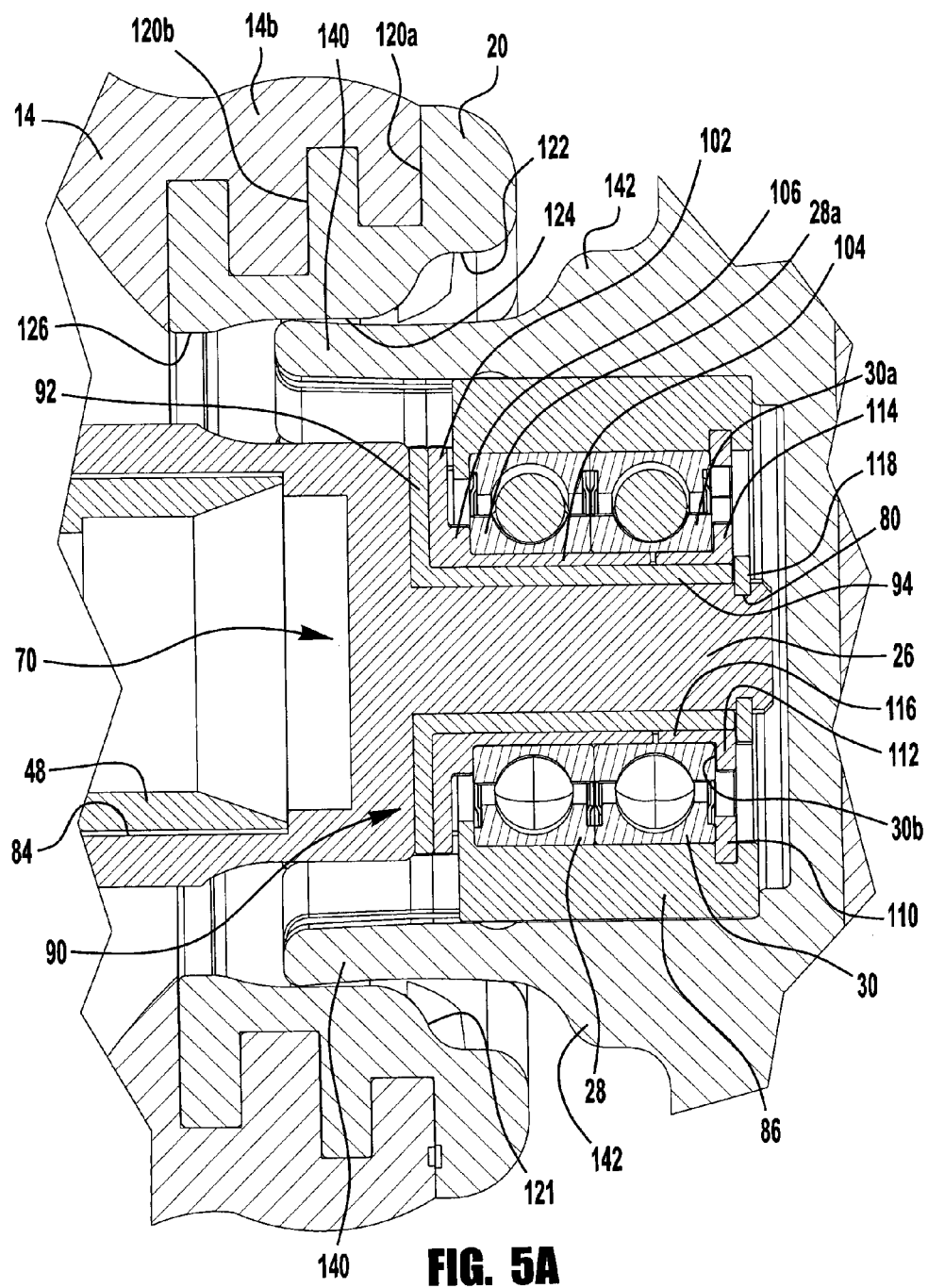
FIG. 5A is an exploded cross sectional view of the flexible collar, the indexing ring and the applicator tip, in accordance with the present invention.

Referring again to FIGS. 3 and 4, a metal bushing 100 having a flange section 102 and a cylindrical section 104 is received on the cylinder section 94 of the isolation and insulation bushing 90 so that the flange section 102 of the metal bushing abuts against the flange section 92 of the isolation and insulation bushing. The metal bushing 100 includes a shoulder 106 disposed about the cylindrical section 104 and abutted against the flange section 102. As best seen in FIG. 5A, the shoulder 106 abuts against the inner race 28a of the bearing 28 and acts to transmit forces from the inner races 28a and 30a of bearings 28 and 30 to the flange section 92 of the isolation and insulation bushing 90.

The ball bearing assemblies 28 and 30 in bearing cage 86 are held in place by a snap ring 110. A bushing 112 having a flange section 114 and a cylindrical section 116 is inserted between and in direct contact with the cylindrical section 94 of the isolation and insulation bushing 90 and the inner race 30a of the bearing assembly 30 so that the flange section 114 engages the an end 30b of the inner race 30. The bushing 112 is held in place by a snap ring 118 placed in the groove 80 formed at the end of offset shaft 26.

Referring to FIG. 5, one end 14a of flex collar 14 is secured at one end 14a to the plurality of grooves 54a, 54b, and 54c of locating support ring 16, preferably by molding. A ring 130 can be disposed about the end 14a of flex collar 14 to ensure that the end 14a remains securely attached to support ring 16.

An indexing ring 20, generally located where the outer portion 48 of the applicator tip 40 disposed near the bearing 26, is mounted to the opposite end 14b of the flex collar 14 preferably with the flex collar being molded into grooves 120a and 120b of the indexing ring. Indexing ring 20 has an inner bore 121 with a first section 122 having a first diameter, a second section 124 having a second diameter smaller than the first diameter and a third section 126 having a smaller diameter than the second diameter. A plurality of lugs are disposed about the first section of indexing ring 20 as seen in FIG. 3.

The indexing ring 20 secures the applicator tip 18 to the angle die grinder 12 as discussed in more detail hereinafter.

FIG. 7 shows the applicator tip 18, which can be constructed of a plastic like ABS or nylon or a similar material in relation to an applicator pad 130 mounted to the lower surface 132 of the applicator tip. The applicator tip 18 can have a crenelated upper portion 134 that projects outward and substantially perpendicular to upper surface 136 of the applicator tip engages the indexing ring 20, and a lower portion 136 that is shown as a square but can be provided in various shapes and designs as described further herein below.

The upper portion 134 includes a plurality of flexible fingers 140 that are spaced from each other. Below each finger 140 is a lug 142 that is spaced from the adjoining lugs on either side. A small distance up the fingers 140 is a pinch point 144 where the fingers bend as discussed herein below.

An applicator pad 130 can have an upper surface 130a that can be mounted to the bottom surface 132 of applicator tip 18. The upper surface 130a and the bottom surface 132 are preferably the same shape and be permanently secured to each other by any means such as glue. The applicator pad 130 has a bottom surface 130b that includes a layer 148 of J-hooked Velcro-type material permanently attached thereto. The layer 148 has a layer of neoprene epoxied thereto which in turn is bonded to the bottom 130b of the applicator pad 130.

A layer of sandpaper 148 having a layer of J-hooked Velcro-type material permanently attached thereto can be removably attached to the J-hooked Velcro-type material of the layer 148.

Figure 9A:
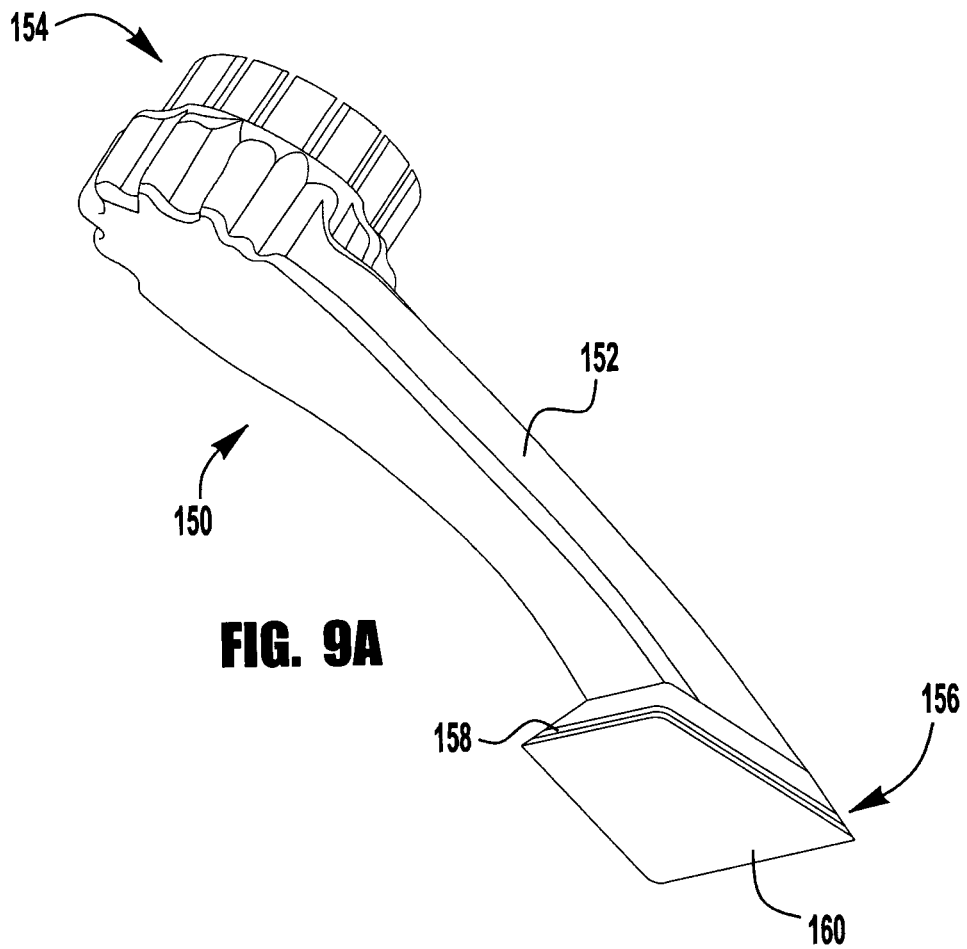
FIG. 9A is a three dimensional view of the applicator tip and the applicator pad with the sandpaper face, in accordance with the present invention.
Figure 9B:
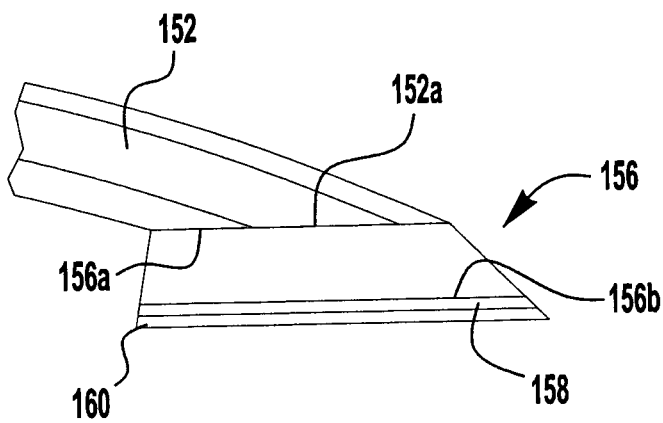
FIG. 9B is a three dimensional view of an applicator tip and the applicator pad with the sandpaper face, in accordance with the present invention.

Referring to FIGS. 9A and 9B, there is illustrated another embodiment of an applicator 150 having an elongated arm 152 connecting the crenelated upper portion 154, that is substantially identical to the crenelated upper portion 134 of FIG. 8 and an applicator pad 156, that is substantially identical to the applicator pad 130 of FIG. 8. Applicator pad 156 has an upper surface 156a that is mounted to bottom surface 152a of the arm 152. The upper surface 156a and the bottom surface 152a are preferably the same shape and be permanently secured to each other by any means such as glue. The applicator pad 156 has a bottom surface 156b that includes a layer 158 of J-hooked Velcro-type material permanently attached thereto. The layer 158 has a layer of neoprene epoxied thereto which in turn is bonded to the bottom 156b of the applicator pad 156.

A layer of sandpaper 160 having a layer of J-hooked Velcro-type material permanently attached thereto can be removably attached to the J-hooked Velcro-type material of the layer 158.

Operation

Referring to FIGS. 3 and 4, the offset bearing shaft 26, the collet 70 and the counterweight 74 in conjunction with the bearings 28 and 30 operate as a single assembly and provide three functions.

First, it secures all the other assembled parts to the die grinder 12, as shown in FIG. 1.

Second, the single assembly causes the desired orbital motion of the surface face of the applicator tip 18.

Third, the bearings 28 and 30 transmit positive pressure to the sanding surface of applicator tip 18 in either a positive or negative direction parallel to the axial rotation about the centerline CL-CL of the tool spindle 30 as well as in the X-Y plane to achieve orbital motion of the sanding surface.

Discussion of Main Individual Component Parts

Counterweight Assembly

The counterweight assembly 74 reduces the operating vibration of die grinder 10 by providing an offset load through counter weight 74 to counter balance the combined centrifugal weight of the offset bearings 28 and 30, the flex collar/indexing ring 20, and the work tip assembly 18.

Another advantage of adding the counterweight assembly 74 to the orbital motion attachment 10 is to increase the effective stroke diameter or the amount of movement perpendicular to the centerline CL-CL at operating RPM of the output shaft 40. This increase in movement increases the cutting effectiveness of the applicator pad 148 mounted to the applicator tip assembly 18 by a considerable percentage.

Locating Support Ring

The locator support ring 16, as shown in FIG. 1, fixes the axial rotation of the upper portion of the flex collar 14. It also establishes the positioning of the indexing ring 22 to the counterweight assembly 74 and supports the force of the z motion developed by the flex collar 14 when the applicator tip 18 is assembled with the other tool components. The support ring saddle 60 anchors the axial motion of the flex collar 14.

Flex Collar

The flex collar 14 has two primary purposes: It acts as a torsion spring, and it provides a spring effect parallel to the axis of rotation of the attachment 10 of the angle die grinder 12. By preventing rotation of the indexing ring 20, rotation of the applicator tip 18 is also prevented. The flex collar 14 also provides positive spring pressure in the Z axis, i.e., in the direction of the axis of rotation CL-CL.

The flex collar 14 also provides lateral stability to the applicator tip 18 and provides a Z axis force that is necessary for the locking function of the tip 18 into the indexing ring 20. The flex collar 14 and the indexing ring 20 can be retracted by hand motion in the Z direction, thus disconnecting the fingers 140 from the indexing ring. The flex collar 14 is operated by first releasing the indexing ring 20 from a retracted location which movement is allowed by the elastic movement of the flex collar in a negative Z direction.

Indexing Ring

The indexing ring 20 is permanently attached to flex collar 14. When the crenelated portion of the applicator tip 18 is seated in the operating position within the indexing ring 20, the applicator tip 18 is locked into the indexing ring by any desired means.

Applicator Tip

The applicator tip 18 connects with and locks into the indexing ring 20, and it also holds the applicator pad 130 to which attaches surface finishing material. The applicator tip 40 transfers orbital motion of the offset bearing shaft 20 and bearing 26 to the applicator tip, which itself can have a multiplicity of shapes.

Operation

First, the orbital motion attachment 10, including the locator support ring 16, the collet 70, the flex collar 14, and the indexing ring 20 is mounted to angle die grinder 12. Then the fingers 140 of the applicator tip 18 are inserted into the indexing ring 20 until they are stopped by contact with the section 142 of the indexing ring 20. Next, the flex collar 14 is retracted and the applicator tip 18 is inserted further into the indexing ring 20 so that the lugs 142 at the base of the fingers 140 engage the lugs in the indexing ring. Next, the flex collar 14 is moved back and the smaller diameter of section 124 causes the fingers 140 to flex about pinch points 144 and squeeze against the bearing cage 86 so that the applicator tip 18 is securely mounted to the angle die grinder 12.

In operation, the output shaft 40 of the grinder, which is rotating at about 20,000 rpm, rotates the rotary offset bearing shaft 26. Being that the center line A-A of the bearing shaft is off center from the centerline C-L of the output shaft, the bearings 28 and 30, along with the bearing cage 86 and the applicator tip 18 are also being moved with an orbital motion. However, the rotational movement of the bearing shaft 26 is only transmitted to the inner races 28a and 30a of the ball bearings 28 and 30. However, the outer races of ball bearings 28 and 30 do not rotate and therefore only orbital motion is transmitted to the applicator 18.

Referring again to FIGS. 3 and 4, cylindrical section 104 supports any loads generated by the bearings 26 and 28 and directs any forces into the cylindrical section 94 of the isolation and insulation bushing. The shoulder 106 directs the forces from the inner races into the flange 102 and then into the flange 92 of the isolation and insulation bushing 90. Being that the isolation and insulation bushing 90 is constructed of a plastic material which absorb high frequency vibrations, such as those originate from the bevel gear transfer through the gear teeth, it prevents these vibrations from migrating into the bearings 28 and 30 and then into the applicator tip 18. These high frequency vibrations cause a great deal of heat to be generated which in turn will cause the applicator tip 18 to overheat and even melt and premature bearing failure.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. An orbital motion attachment for a die grinder, comprising:
   a flexible collar mounted at a first end to a locating support ring, the locating support ring being removably secured to the die grinder;
   a collet having an offset bearing shaft extending from a first end, the collet being connected at a second end to an output shaft of the die grinder;
   the offset bearing shaft being connected at a second end to an applicator tip;
   an indexing ring that is affixed to a second end of the flexible collar to secure the applicator tip to the offset bearing shaft;
   wherein a centerline through the offset bearing shaft is offset from a centerline through the output shaft;
   wherein the collet has a counterweight projecting therefrom on the opposite side of the centerline through the output shaft from the centerline through the offset bearing shaft;
   wherein the offset bearing shaft is disposed within one or more bearings within a bearing cage;
   wherein an isolation and insulation bushing having a cylindrical section is disposed between the bearings and the offset bearing shaft and a flange section disposed against the second end of the collet;
   a metal bushing having a cylindrical section disposed between the cylindrical section of the isolation and insulation bushing and a flange section abutted against the flange section of the isolation and insulation bushing;
   wherein the metal bushing includes a shoulder disposed about the cylindrical section and abutted the flange section, the shoulder being abutted against an inner race of one of the one or more bearings;
   wherein the indexing ring has:
   an inner bore with one section having a first diameter and another section having a smaller diameter than the one section; and
   a plurality of lugs are disposed about the one section.

2. The orbital motion attachment of claim 1 wherein the applicator tip has an upper portion that projects outwardly and substantially perpendicular to upper surface of the applicator tip for engaging the indexing ring.

3. The orbital motion attachment of claim 2 wherein the upper portion of the applicator tip has a plurality of flexible fingers that are spaced from each other, each having a lug therebelow.

4. The orbital motion attachment of claim 3 wherein the lugs disposed below the flexible fingers on the upper portion of the applicator tip are spaced to accommodate the plurality of lugs on the indexing ring.

5. The orbital motion attachment of claim 4 wherein the applicator tip has an applicator pad mounted to a lower surface of the applicator tip.

6. The orbital motion attachment of claim 4 wherein the applicator pad has a bottom surface that includes a layer of Velcro-type material permanently attached thereto.

7. The orbital motion attachment of claim 6 wherein a layer of sandpaper having a layer of Velcro-type material permanently attached thereto can be removably attached to the Velcro-type material of the layer.

* * * * *